US007884691B2

(12) United States Patent
Findeisen

(10) Patent No.: US 7,884,691 B2
(45) Date of Patent: Feb. 8, 2011

(54) ELECTRICAL COMPONENT WITH A COOLING CIRCUIT FOR UNDERWATER OPERATION

(75) Inventor: Jörg Findeisen, Dresden (DE)

(73) Assignee: Siemens AG, Munich (DE)

( * ) Notice: Subject to any disclaimer, the term of this patent is extended or adjusted under 35 U.S.C. 154(b) by 487 days.

(21) Appl. No.: 11/794,405

(22) PCT Filed: Dec. 22, 2005

(86) PCT No.: PCT/EP2005/057126

§ 371 (c)(1),
(2), (4) Date: Jun. 27, 2007

(87) PCT Pub. No.: WO2006/069974

PCT Pub. Date: Jul. 6, 2006

(65) Prior Publication Data

US 2008/0164966 A1    Jul. 10, 2008

(30) Foreign Application Priority Data

Dec. 27, 2004    (DE) .................... 10 2004 063 508

(51) Int. Cl.
*H01F 27/10* (2006.01)
(52) U.S. Cl. .......................................... 336/57; 336/58
(58) Field of Classification Search .............. 336/57, 336/58
See application file for complete search history.

(56) References Cited

U.S. PATENT DOCUMENTS 1,539,837 A     6/1925   Hayes
4,309,734 A     1/1982   Warren
6,456,179 B1    9/2002   Backa et al.
6,568,287 B2 *  5/2003   Golner et al. ............ 73/863.71
6,867,364 B2 *  3/2005   Hafskjold et al. ............ 174/50
2004/0051615 A1 3/2004   Hafskjold et al.
2006/0220386 A1 10/2006  Wobben

FOREIGN PATENT DOCUMENTS

| DE | 1 108 775    |         | 6/1961  |
| DE | 101 01 405 A1|         | 7/2002  |
| DE | 202 06 234 U1|         | 8/2002  |
| DE | 103 10 036 A1|         | 8/2004  |
| DE | 699 16 265 T2|         | 4/2005  |
| GB | 371926       |         | 4/1932  |
| GB | 2 351 124 A  |         | 12/2000 |
| WO | 99/63555     |         | 12/1999 |
| WO | 02/41336 A1  |         | 5/2002  |

* cited by examiner

*Primary Examiner*—Anh T Mai
*Assistant Examiner*—Joselito Baisa
(74) *Attorney, Agent, or Firm*—Laurence A. Greenberg; Werner H. Stemer; Ralph E. Locher

(57) ABSTRACT

An electrical component with winding conductors, particularly a transformer, includes a cooling circuit with a heat exchanging unit. Cooling elements of the heat exchanging unit can be flowed around by a first liquid, particularly seawater, thus enabling an effective exchange of the heat resulting during the operation of the electrical component. The novel electrical component is configured particularly for offshore uses wherein the electrical component is placed at different levels of a platform and thus requires only a small amount of space.

11 Claims, 5 Drawing Sheets

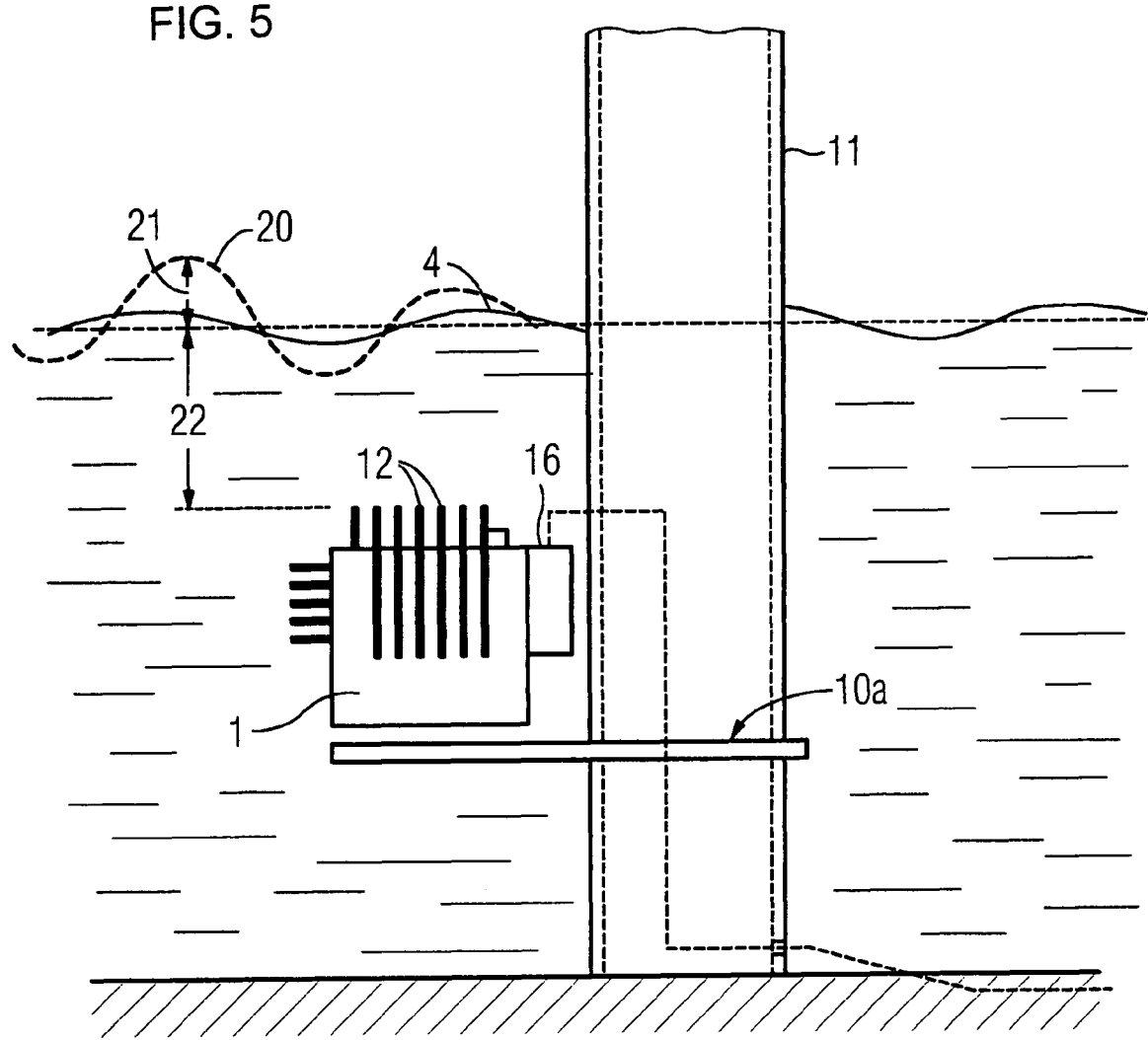

ELECTRICAL COMPONENT WITH A COOLING CIRCUIT FOR UNDERWATER OPERATION

BACKGROUND OF THE INVENTION

Field of the Invention

The invention relates to an electrical and/or electronic component, in particular a transformer, comprising a cooling circuit with a heat exchanging unit. The invention also covers the connection between such components in offshore platforms, and the configuration of such platforms.

The shortage of suitable on-shore locations and the high windspeeds at sea, have made offshore wind energy utilization a financially interesting alternative to the on-shore installation of wind energy installations.

One major cost driver for linking an offshore wind farm to the grid system is the substations which have to be installed at the sea end.

The electrical components used, such as transformers, rectifiers and switches, are, according to the prior art, either mounted and operated on a platform level located above the water, or are accommodated within encapsulated segments, such as the tower of a wind energy installation. For example, DE 103 13 036 A1 describes one method for installing a wind energy installation. The power module in the invention there is, in particular, a transformer which has a mount, which is placed on the foundation of the wind energy installation and is then completely surrounded by the tower of the wind energy installation.

However, the invention there has the disadvantage that the thermal energy created as a result of the operation of the transformer rises in an uncontrolled form into the tower of the wind energy installation and is not deliberately carried away from the transformer. The invention there does not ensure that the heat from the transformer is dissipated effectively and uniformly.

Furthermore, this allows only electrical components which have dimensions that are considerably less than the diameter of the tower to be accommodated there.

The arrangement of electrical components well above the sea surface has been known for a long time from the prior art. The background to the great physical height of offshore platforms is that the design of the platforms required in the offshore area is based on the so-called hundred-year wave as the calculation basis for design purposes, corresponding to the largest possible peak wave in the last one hundred years in the respective region. Because of these physical constraints, the electrical components such as transformers and other components of a substation on the high seas are arranged on platform levels considerably above the water level in order to protect them against destruction by a hundred-year wave, and this is associated with considerable costs for installation and operation of the platforms. Owing to the great heights above sea level of these platforms designed in this way, the design and the materials used for the platform are subject to very stringent robustness requirements.

For example, foundations for wind energy installations are known from DE 10310708A1, and require a large amount of construction effort.

Furthermore, it is prior art for the thermal energy to be dissipated by means of additional radiators and fans, with the radiators and fans being fitted alongside one another on the tank wall of the transformer. A multiplicity of radiators must be arranged over a large area on the tank wall of the transformer in order to provide adequate heat dissipation. These radiators are fitted with fans for vertical or horizontal ventilation of the transformer tank wall, thus enlarging the physical volume required by the transformer. The use of fans likewise necessitates the fitting of additional installations and circuits in order to provide the operating voltage and in order to control the fans. Additional space must be provided in the immediate vicinity of the transformer for this purpose.

The energy consumed by the fans likewise incurs costs. The control system for the fans must be accommodated in specific switchgear cabinets with switching devices. When using fans, motor circuit breakers as well as monitoring appliances for protection and control must be fitted to the transformer, in some cases resulting in high installation costs and operating costs. Furthermore, an electrical connection is required between the fan switchgear cabinet and the fans, and must be comprehensively protected in accordance with the environmental conditions in the offshore area. The fan control cabinet and the fans themselves furthermore require regular inspection and servicing, and this is associated with considerable costs, particularly in the case of offshore installations. Furthermore, inspection and servicing tasks cannot be carried out by people on site at any time in the offshore area, because of the weather and the time of year.

Alternatively, an underwater transformer is known from the prior art, such as that disclosed in DE 101 27 276 A1, which is designed for operation under the sea surface. No platform is generally required above the sea surface for operation of an underwater transformer. Previous underwater transformers have had the disadvantage, however, that they do not have specific heat dissipation and must therefore be designed to be larger than is actually necessary.

Underwater transformers such as these furthermore require complex means in order to ensure pressure equalization in the event of thermally dependent volume fluctuations of the cooling medium and/or insulating medium.

A further underwater transformer, which has a second container, which completely surrounds the first container and is equipped with pressure-tight cable bushes, is described in EP 1082736B1. This concept is also in fact intended for use with small distribution transformers at extreme depths, does not solve the stated problem, and does not ensure effective cooling.

SUMMARY OF THE INVENTION

One object of the present invention is therefore to provide a low-maintenance electrical and/or electronic component which allows effective heat dissipation during operation on the high seas and at the same time ensures that the electrical and/or electronic component has small dimensions. A further object of the invention is to design an offshore substation which is considerably more economic than the prior art.

For the purposes of the invention, the expression an electrical component in the following text means an electrical and/or electronic component, and/or a combination of corresponding components.

The expression transformer is used to represent electrical components.

According to the invention, the object is achieved by the features of patent claim 1. In this case, provision is made for a first liquid, in particular sea water, to be able to flow around at least one cooling element of the heat exchanging unit, with the distance between the cooling elements and the dimensions of the cooling elements being chosen to ensure that the first liquid flows in a turbulent form around the cooling elements. The dimensions of the cooling elements and the respective distances can be chosen as a function of the viscosity of the chosen first liquid. This arrangement makes it possible to ensure effective heat dissipation of the heat created during operation of the electrical component, since the turbulent flow results in large amounts of liquid coming into contact with the heat exchanging unit, and absorbing and quickly dissipating the heat which is emitted from the heat exchanging unit. When the electrical component is used in the offshore area, the heat exchanging unit is arranged on a platform level below the sea surface, allowing heat to be exchanged with the sea water that is present there, as the first liquid. The average temperatures of the sea water are, for example, at most 20° C. in the North Sea and Baltic Sea, and are thus ideally suitable for use as a heat sink for the thermal energy created in the electrical component, which is emitted to the surrounding sea water via the heat exchanging unit.

In order to ensure a high flow rate of the first liquid past the heat exchanging unit, flow guide devices are arranged in the vicinity of the heat exchanging unit in one preferred embodiment of the electrical component. This results in the sea water being ducted and passed to the heat exchanging unit as the first liquid. The flow guide devices are designed such that they either produce a laminar flow in the direction of the cooling elements, which then results in a turbulent flow of the sea water as a result of the dimensions of the cooling elements. On the other hand, the shape of the flow guide device, particularly when installed in the physical proximity of the heat exchanging unit, can be designed such that a turbulent flow is produced directly, which is then further enhanced by the dimensions of the cooling elements of the heat exchanging unit.

The shape, size and number of flow guide devices are in this case chosen as a function of the environmental conditions and of the flow speeds of the sea water in the vicinity of the heat exchanging unit. Large-area flat arrangements are particularly preferable as the shape of the flow guide device which deflect and duct the sea flows from the various directions in the direction of the heat exchanging unit. By way of example, DE 10 2004 030 522.6 discloses one example for the shape of the flow guide devices.

The electrical component is advantageously closed to form a seal and the sea water can flow completely around it as the first liquid, with the outer wall of the electrical component having cutouts and spacing surfaces in order to enlarge the surface area, and/or flow guide devices in order to duct the first liquid. Enlarging the surface area of the electrical component by means of additional spacing surfaces and cutouts not only ensures effective heat dissipation via the cooling circuit, but also via the direct outer wall of the electrical component. The sea water flowing around the transformer results in the greatest possible amount of heat being exchanged, and thus in optimum cooling of the transformer as the electrical component, as a result of the enlargement of the heat exchanging area, not only with respect to the heat exchanging unit but also with respect to the entire outer wall of the transformer.

In one preferred refinement, a second liquid, in particular a cooling oil, circulates within the cooling circuit, with the cooling circuit at the same time being connected to a liquid expansion vessel above the surface of the first liquid. The cooling circuit is in this case connected via a connecting channel to the liquid expansion vessel. This refinement of the electrical component produces the overpressure, which is advantageous for electrical safety, within the component.

This vessel is advantageously used to absorb the thermally dependent volume fluctuations of the cooling and/or insulating liquid of the component and/or of the cooling circuit.

At the same time, the liquid expansion vessel makes it possible to compensate for pressure fluctuations within the cooling circuit.

One particular problem is represented by underwater electrical connections. In a further embodiment of the invention, this problem is solved by passing oil-filled line channels to the platform. This embodiment allows the cables to be connected or replaced safely and without problems, since they are connected above the surface of the water. The connection is advantageously made by means of cable connecting bushes.

In the exemplary embodiment (FIGS. 2 and 3), the cooling-medium line to the expansion vessel is combined with the line channel for the electrical connection. In this case, a cable connecting box is provided underneath the expansion vessel.

Furthermore, it is possible to use the supporting pillars of the offshore platform as a cable channel (FIGS. 3 and 5). These supporting pillars can also be filled with an insulating liquid in one particular embodiment, and can thus be used as a safe, oil-insulated line channel. In this case as well, when an oil expansion vessel is used, it is possible to combine the oil expansion line to the expansion vessel, which is located above the water level, with the line channel for the electrical connection in a supporting pillar.

Electrical connecting lines to the electrical component are preferably arranged in the connecting channel, with the connecting lines being designed such that they are not chemically and/or physically damaged by the second liquid, for example as a result of external coating on the connecting lines, or the choice of material for that.

The connecting channel can thus be completely integrated in the cooling circuit and can be filled with the second liquid, such as cooling oil. In this case, the electrical connecting lines are integrated in the cooling circuit, and are passed to a platform level located above the sea surface. The electrical connection between the electrical component located under the sea surface and the external voltage supply lines is made on this platform level by means of suitable contact pieces and cable connecting bushes. Alternately, two connecting shafts which are separated from one another run in the connecting channel, are on the one hand reserved for the electrical connecting lines, and on the other hand produce a separate connection between the liquid expansion vessel and the cooling circuit. In this configuration of the electrical component, the electrical connecting lines need not be specifically protected against chemical and/or physical damage caused by the cooling oil.

In one preferred embodiment, the parts of the electrical component, in particular the heat exchanging unit, the electrical external connection and the liquid expansion vessel, are arranged on different platform levels. Some of the platform levels are located underneath the sea surface. This arrangement allows effective space utilization of the electrical component on the platform and a considerable reduction in the size of the platform, particularly for installations for offshore applications. Those surface areas which are subject to the wind load and the hundred-year wave are considerably reduced, or can even be avoided completely, as a result of the reduction in the platform size. This likewise results in a considerably reduced load on the supporting pillars of the platform. The reduced load on the static structure of the platform means that there is no need for any large-volume anchorages for the supporting pillars on the sea bed, thus avoiding costs and environmental loads on the seabed structure.

The electrical connecting lines and/or cooling channels are preferably arranged within the platform supports. Laying the lines and channels within the platform supports means that there is no need to provide a separate connecting channel between the heat exchanging unit, which is located under the sea surface, and the electrical component, which is arranged on different platform levels, and/or the expansion vessel, which is located above the water surface, for the cooling liquid and/or insulating liquid. In addition, the connecting lines and cooling channels are protected against external influences, such as corrosion caused by sea water, strong sea water currents or wind load.

Further embodiments according to the invention are described in the dependent claims. The invention will be explained in more detail with reference to the following drawings, in which:

BRIEF DESCRIPTION OF THE SEVERAL VIEWS OF THE DRAWING

FIG. 5 shows a schematic illustration of the platform according to the invention.

DESCRIPTION OF THE INVENTION

Figure 1:
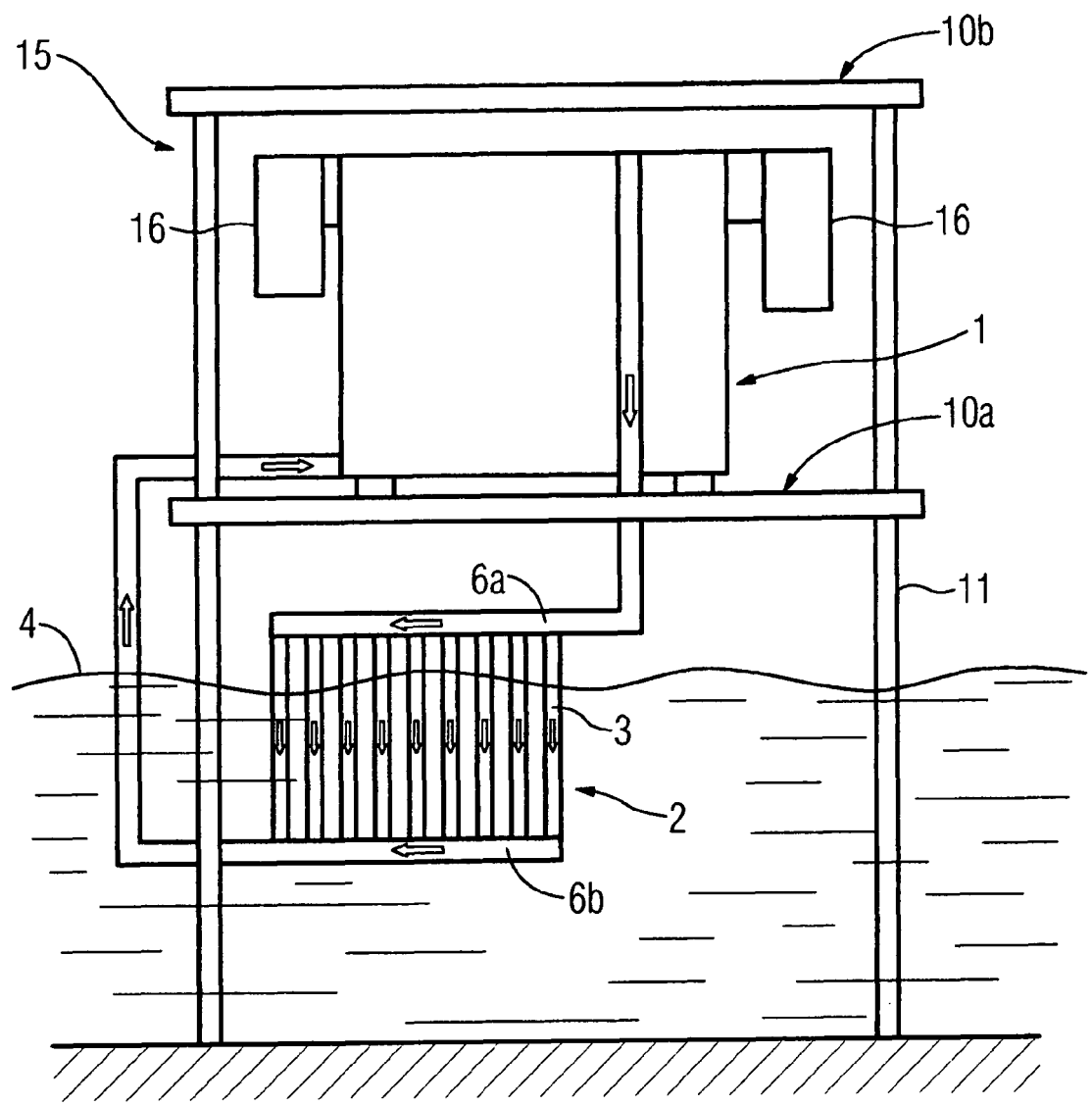
FIG. 1 shows a schematic illustration of the electrical component according to the invention, above the sea surface on a platform.

FIG. 1 shows a transformer according to the invention as an electrical component 1 arranged on a platform 15 above the sea surface, with the sea water defining the first liquid 4 for the purposes of the invention. The cooling circuit 6a, 6b is connected to a heat exchanging unit 2, which is arranged on or under the surface of the first liquid 4, that is to say the sea surface. The sea water 4 flows around the cooling elements 3 of the heat exchanging unit 2, and these cooling elements effectively dissipate the heat located in the cooling medium of the cooling circuit 6a, 6b. The distance between the cooling elements 3 and the dimensions of the cooling elements 3 relative to the incidence direction of the first liquid 4 are chosen so as to ensure that the first liquid 4 flows around them in a turbulent form.

Figure 2:
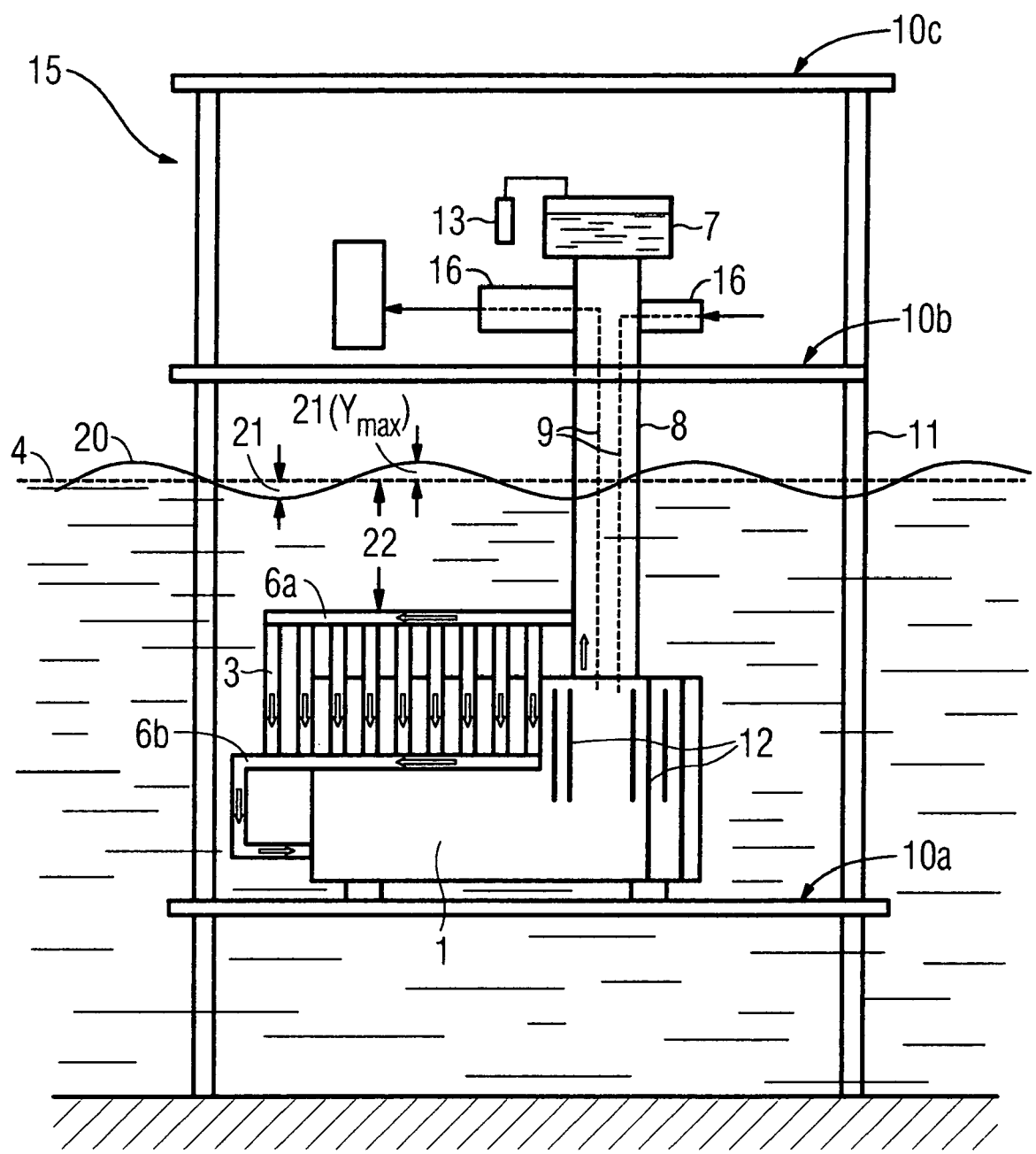
FIG. 2 shows a schematic illustration of the electrical component according to the invention, under the sea surface with a liquid expansion vessel.

FIG. 2 shows a transformer 1 according to the invention which is arranged under the surface of the sea water 4 on the lowest level 10a of the platform 15, with the heat exchanging unit 2 likewise being located under the surface of the sea water 4. Pressure equalization of the cooling medium which is located in the cooling circuit 6a, 6b, in this case a cooling oil, is ensured via a liquid expansion vessel 7 which is arranged above the surface of the sea water 4. The liquid pressure head in the connecting channel 8 between the liquid expansion vessel 7 and the transformer 1 likewise produces a sufficient internal pressure within the component and its cooling circuit 6a, 6b relative to the environmental pressure of the external sea water 4. This expansion vessel is advantageously equipped with an air dehumidifier 13 in order to prevent moisture from being introduced into the cooling liquid and/or insulating liquid. The liquid pressure of the first liquid 4 on the electrical component 1—and thus on the cooling circuit 6a, 6b—results in the liquid expansion vessel 7 being used on the one hand as an overflow reservoir and on the other hand to build up the necessary internal pressure within the cooling circuit 6a, 6b. Furthermore, the electrical connecting lines 9 to the transformer 1 can be passed via the connecting channel 8 between the transformer 1 and the liquid expansion vessel 7. Cutouts and spacing surfaces 12 are applied to the outer wall of the transformer 1 and increase the heat that is emitted through the enlarged heat exchanging surface area to the surrounding sea water 4.

FIG. 2 also shows an offshore platform 15 according to the invention, with the level 10a for holding an electrical component being arranged under the water surface 4. The design of the platform 15 according to the invention makes it possible to considerably reduce the size of the platform 15. The only platforms which have so far been known from the prior art are those whose levels are arranged well above the water surface, thus ensuring protection against the regionally different hundred-year wave. The platform 15 according to the invention allows electrical components, such as electrical components 1 according to the invention, to be arranged under the water surface 4, and thus to be protected against the influences on the water surface.

The illustrated exemplary embodiment shows an offshore platform for a substation, characterized in that the large-area and heavy components which are critical for the design on the basis of mass, maximum wind load and the so-called hundred-year wave, in particular transformers 1 and rectifiers, are arranged under the water level, at a depth which corresponds at least to the amplitude 21 of the hundred-year wave 20, as determined for that location, under the sea level.

According to the invention, the platform levels which are intended for positioning of the assemblies 1 of the substation are designed such that they are entirely or partially permeable for flowing media 4. In the exemplary embodiment, the entire underwater level 10a is open at the side, so that this produces only a small amount of resistance, that needs to be taken into account for design purposes, to the sea-water currents, while at the same time allowing good sea-water access to the components to be cooled.

Figure 3:
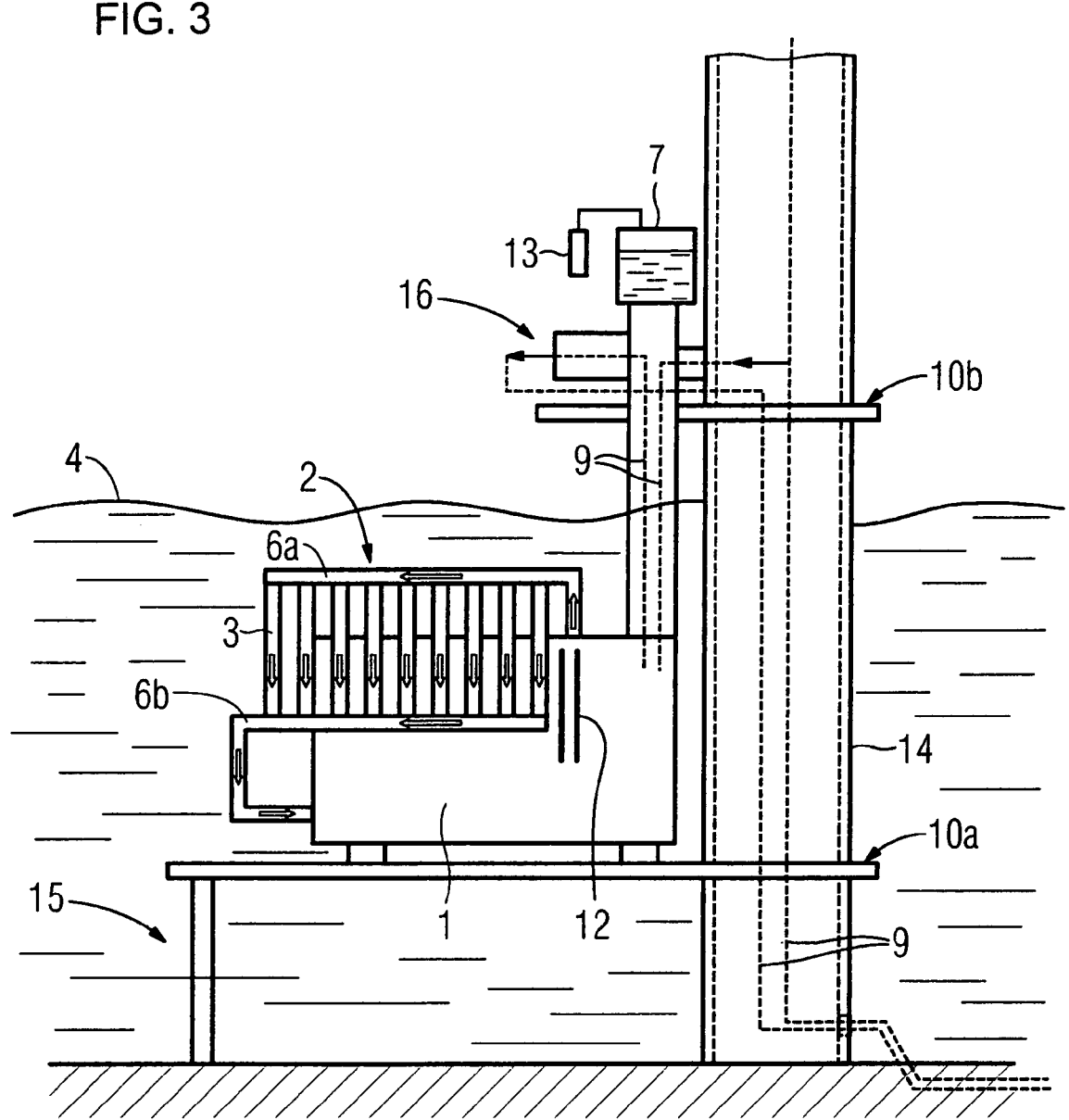
FIG. 3 shows a schematic illustration of the electrical component according to the invention, arranged on the tower of an offshore wind energy installation, under the sea surface.

FIG. 3 once again shows a transformer 1 according to the invention, whose heat exchanging unit 2 is arranged under the surface of the sea water 4 on a platform 15 and has a liquid expansion vessel 7 which is arranged above the sea water 4. In FIG. 3, the platform 15 is fitted to the lower tower area 14 of a wind energy installation and does not require any additional pillars extending to the sea surface. The robustness of the upper platform segment 10b is ensured exclusively by the connection to the tower 14 of the wind energy installation. The reduction in the number of platform pillars passing through the sea surface further reduces the area on which the so-called hundred-year wave acts. Since neither the electrical component 1 nor additional pillars in this case extend into the area in which the hundred-year wave and strong winds act, this allows considerable savings for the base, the foundation and the overall structure of the offshore substation.

Figure 4:
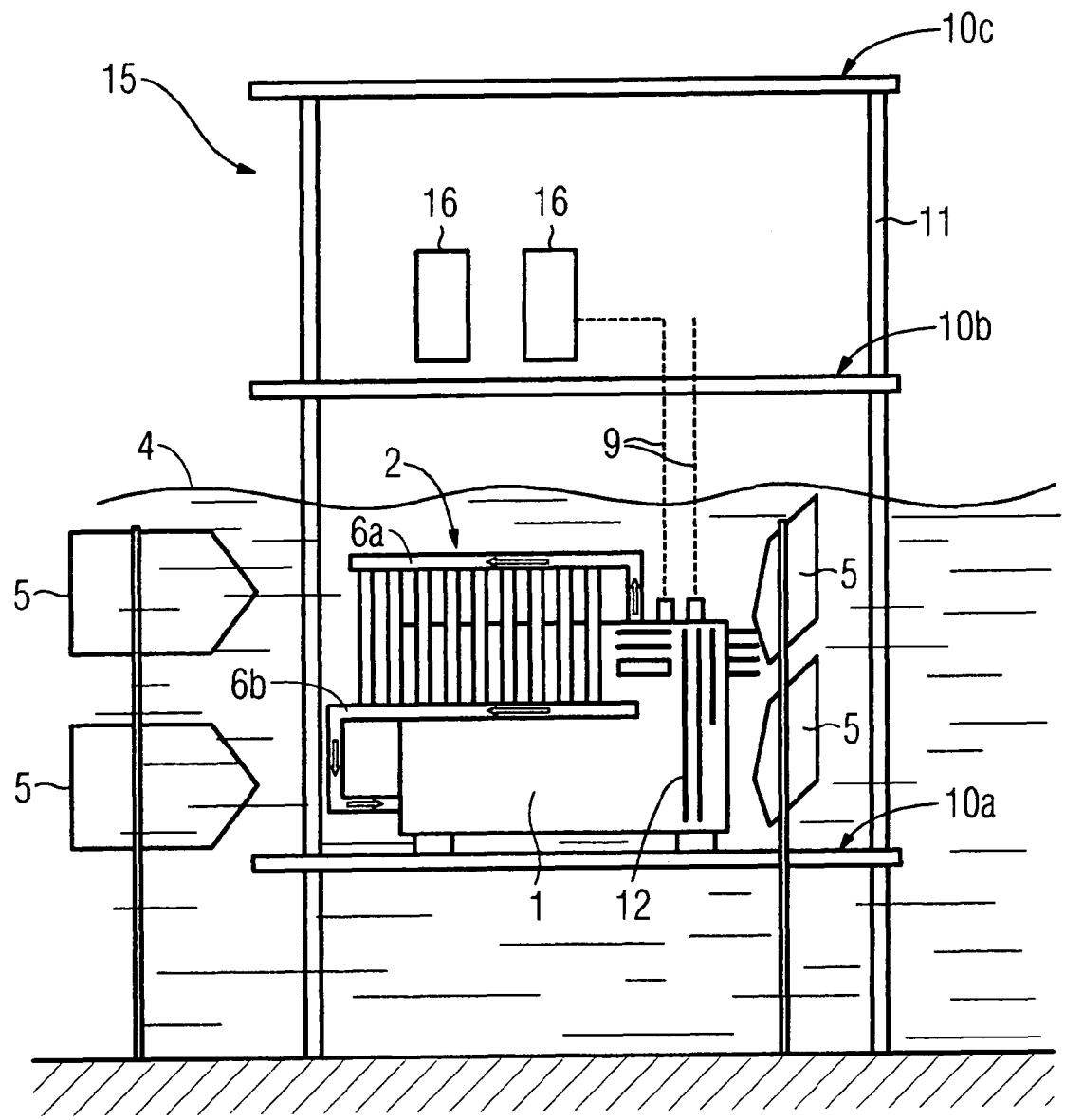
FIG. 4 shows a schematic illustration of the electrical component according to the invention, under the sea surface, with flow guide devices according to the invention.

The flow guide devices 5 in FIG. 4 may be installed either directly adjacent to the transformer 1, which is located under the sea surface, or in the immediate vicinity of the heat exchanging unit 2. In this case, the flow guide devices 5 are attached directly to the transformer 1 or to the platform 15. It is likewise possible to arrange the flow guide devices 5 outside the platform 15, thus ensuring a far-reaching flow field to the transformer 1 according to the invention or to the heat exchanging unit 2. The shape, size and number of flow guide devices 5 varies depending on the environment and the flow speed, with flow guide devices 5 for example as described in DE 10 2004 030 522.6 also being used in addition to smooth surfaces.

FIG. 5 shows an exemplary embodiment in which the electrical component is fitted to the tower 11 of a wind energy installation such that it is located under the water level 4 and outside the tower 11, and its weight is borne by the foundation of the tower of the wind energy installation. This arrangement of the component according to the invention makes it possible to considerably reduce the platform costs. In this case, the electrical component is once again arranged under the water level 4 in this exemplary embodiment, such that a distance 22 is maintained above the component to the sea level 4, which distance 22 is greater than the amplitude 21 of the hundred-year wave 20 as determined for that location. At the same time, the already described effective cooling of the electrical component is also achieved in this exemplary embodiment. The power is supplied or passed on through underwater cables (represented as a dashed line in FIG. 5). In this case, the electrical supply lines are integrated in the platform, in particular in the supports 11.

The invention claimed is:

1. An assembly, comprising:
   an electrical component with winding conductors;
   a cooling circuit with a heat exchanging unit for cooling said electrical component, said heat exchanging unit including at least on or a plurality of cooling elements disposed for a first liquid flowing around said one or more cooling elements, said cooling circuit containing a second liquid circulating therewithin, and said cooling circuit being connected to a liquid expansion vessel above a surface of the first liquid via a connection channel;
   wherein said at least one cooling element is dimensioned and/or said plurality of cooling elements are spaced with a given spacing distance therebetween to ensure that the first liquid flows in turbulent flow around said cooling element.

2. The assembly according to claim 1, which comprises flow guide devices disposed to duct the liquid onto at least one of said heat exchanging unit and said electrical component.

3. The assembly according to claim 1, wherein said electrical component is closed to form a seal with the liquid flowing completely around said electrical component, said electrical component has at least one of an outer wall formed with cutouts and spacing surfaces for enlarging a surface area thereof, and flow guide devices for ducting the liquid.

4. An electrical device, comprising:
   the assembly according to claim 1 filled with an insulating and/or cooling liquid;
   a second vessel for the insulating and/or cooling liquid, and a connecting channel fluidically connecting said second vessel with said assembly, said second vessel being positioned above a water level of the liquid flowing about said electrical component and effecting an overpressure in the electrical component and said cooling system based on a hydrostatic pressure of said insulating and/or cooling liquid in said second vessel.

5. The electrical device according to claim 4, which comprises electrical connecting lines connected to said electrical component and disposed to run within said connecting channel, with said connecting lines being configured to not be chemically and/or physically damaged by said insulating and/or cooling liquid.

6. The electrical device according to claim 4, wherein at least one of said heat exchanging unit, said electrical component, said electrical external connection, and said liquid expansion vessel is disposed on a platform with at least two levels.

7. The electrical device according to claim 6, wherein at least one of said electrical connecting lines, cooling channels, and said connecting channel is disposed within a support structure of the platform.

8. The electrical device according to claim 1, wherein at least one of said heat exchanging unit and said electrical component is disposed on a platform with at least two levels.

9. An offshore installation, comprising:
   an assembly according to claim 1 and an associated offshore platform for a substation disposed at given offshore location;
   said electrical component being disposed below a sea surface water level by a given distance, and said distance being greater than an amplitude of a hundred-year wave determined for the given offshore location.

10. The offshore platform according to claim 9, wherein said offshore platform is formed with platform levels for positioning various assemblies of said substation, and said platform levels are entirely or partially permeable for flowing media.

11. An electrical substation with at least one assembly having an electrical component according to claim 1, said substation being fitted to a tower of a wind power installation and disposed below the water level and outside the tower, and wherein a weight of the electrical substation is borne by a foundation of the tower of the wind power installation.

* * * * *